United States Patent
Mongeau

(10) Patent No.: US 12,470,110 B2
(45) Date of Patent: Nov. 11, 2025

(54) HIGH VOLTAGE ELECTRIC MACHINE WITH IMPROVED STATOR INSULATION

(71) Applicant: VESTAS WIND SYSTEMS A/S, Aarhus N. (DK)

(72) Inventor: Peter Mongeau, Center Conway, NH (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 361 days.

(21) Appl. No.: 18/008,377

(22) PCT Filed: May 28, 2021

(86) PCT No.: PCT/DK2021/050166
§ 371 (c)(1),
(2) Date: Dec. 5, 2022

(87) PCT Pub. No.: WO2021/244717
PCT Pub. Date: Dec. 9, 2021

(65) Prior Publication Data
US 2023/0318402 A1 Oct. 5, 2023

Related U.S. Application Data

(60) Provisional application No. 63/034,507, filed on Jun. 4, 2020.

(30) Foreign Application Priority Data

Jun. 11, 2020 (DK) .......................... PA 2020 70371

(51) Int. Cl.
*H02K 1/14* (2006.01)
*H02K 1/16* (2006.01)
(Continued)

(52) U.S. Cl.
CPC ........... *H02K 7/1869* (2013.01); *H02K 1/148* (2013.01); *H02K 3/345* (2013.01); *H02K 2201/15* (2013.01)

(58) Field of Classification Search
CPC ........ H02K 7/18; H02K 7/183; H02K 7/1823; H02K 7/1838; H02K 7/1807;
(Continued)

(56) References Cited

U.S. PATENT DOCUMENTS 3,549,926 A * 12/1970 Pentland ................ H02K 3/325
174/117 FF
3,999,093 A * 12/1976 Kirtley, Jr. ............. H02K 55/04
310/201

(Continued)

FOREIGN PATENT DOCUMENTS

CN 115173591 A * 10/2022
CN 116404773 A * 7/2023
(Continued)

OTHER PUBLICATIONS

Danish Patent Office, Search Opinion for Danish Patent Application No. PA 202070371, dated Nov. 20, 2020.
(Continued)

*Primary Examiner* — Edgardo San Martin
(74) *Attorney, Agent, or Firm* — Patterson + Sheridan, LLP; Gero G. McClellan

(57) ABSTRACT

A wind turbine includes a generator with a stator and a rotor mounted for providing electrical power to an electric grid. The wind turbine includes a stator having a core with a plurality of individual adjacent segments coupled together for forming a segmented core. A concentrated winding element is wound around each stator core segment for generating flux in the core segment. An insulation element is positioned between adjacent core segments for electrically
(Continued)

isolating adjacent core segments from each other, the stator core is coupled with a stator support element that is coupled to a generator housing, wherein the stator support element is an electrically insulative element or wherein the stator support element and each stator core segment are electrically isolated from each other.

20 Claims, 11 Drawing Sheets

(51) Int. Cl.
 *H02K 3/32* (2006.01)
 *H02K 3/34* (2006.01)
 *H02K 7/18* (2006.01)

(58) Field of Classification Search
 CPC ........ H02K 7/1869; H02K 1/14; H02K 1/148; H02K 1/146; H02K 1/16; H02K 3/04; H02K 3/18; H02K 3/32; H02K 3/34; H02K 3/345; H02K 3/40; H02K 3/42; H02K 3/28; H02K 2201/15; F03D 9/25; F03D 9/20
 See application file for complete search history.

(56) References Cited

U.S. PATENT DOCUMENTS

| | | | | |
|---|---|---|---|---|
| 4,068,142 | A * | 1/1978 | Gillet | H02K 3/47 310/194 |
| 4,228,375 | A * | 10/1980 | Beermann | H02K 3/47 310/194 |
| 4,990,809 | A * | 2/1991 | Artus | H02K 19/103 310/192 |
| 6,265,804 | B1 | 7/2001 | Nitta et al. | |
| 6,781,276 | B1 | 8/2004 | Stiesdal et al. | |
| 8,373,316 | B2 * | 2/2013 | Beatty | H02K 3/24 310/52 |
| 8,558,423 | B2 * | 10/2013 | Petersen | H02K 9/223 310/59 |
| 10,910,901 | B2 * | 2/2021 | Burch | H02K 3/38 |
| 11,456,630 | B2 * | 9/2022 | Barti | H02K 15/12 |
| 2010/0052626 | A1 | 3/2010 | Tupper et al. | |
| 2010/0327688 | A1 | 12/2010 | Canini et al. | |
| 2015/0280508 | A1 * | 10/2015 | Hirota | H02K 3/522 310/215 |
| 2021/0167668 | A1 * | 6/2021 | Carter | H02K 3/325 |

FOREIGN PATENT DOCUMENTS

| | | | | |
|---|---|---|---|---|
| CN | 117639312 | A * | 3/2024 | |
| EP | 1215800 | A2 * | 6/2002 | ............. H02K 3/24 |
| EP | 2109208 | A1 | 10/2009 | |
| EP | 3252927 | A1 | 12/2017 | |
| EP | 3595147 | A1 | 1/2020 | |
| GB | 2520516 | A | 5/2015 | |

OTHER PUBLICATIONS

Danish Patent Office, Search Report for Danish Patent Application No. PA 202070371, dated Nov. 20, 2020.
International Search Report and Written Opinion for PCT Application No. PCT/DK2021/050166, dated Aug. 3, 2021.

* cited by examiner

HIGH VOLTAGE ELECTRIC MACHINE WITH IMPROVED STATOR INSULATION

TECHNICAL FIELD

The present invention relates to a wind turbine with improved electrical insulation of a stator subassembly for an electrical machine.

BACKGROUND OF THE INVENTION

Modern commercial scale wind turbines are increasingly being used to generate electrical power for supply to electrical distribution grids for onward supply to homes and industry. As the use of wind generated electrical power becomes more prevalent, there is increasing need for generator equipment that may be readily and economically designed, manufactured and maintained.

Electrical generators in wind turbines are often hard mounted to the frame of the wind turbine nacelle, which is positioned at the top of the wind turbine tower. Such an electrical generator will generally comprise a mounted stator element or assembly having a stator core and a rotating rotor element that rotates within the core and electrically interacts with the stator core for the generation of electricity. Specifically, the rotor element is attached to turbine blades that turn with the wind and thus turn the rotor for power generation.

More specifically, the stator element comprises a stator core, with a plurality of coil windings that are wound around portions or segments of the core. Typically, the coil windings include three-phase windings for the supply of three-phase power from the generator. The rotor element that rotates inside the stator core under the power of the wind includes magnets. The action of the rotating magnetic field created by the rotor in the vicinity of the stator induces electric current in each winding for the generation of power. The stator core is typically made from laminated stacks of electrical grade steel to capture the magnetic flux. The stator core represents a shorting path from winding to winding.

To provide electrical insulation between the stator coils and the stator core, a series of insulative layers are used over the coil turns making up the windings. Generally, the coil turns are comprised of copper strands. Specifically, the copper strands in the coil turns may be insulated from each other with strand insulation and each turn may then be further insulated from other turns with a one or more layers of turn insulation. The various strands are usually stacked in tiers and further separated by a strand separator element. There might also be some phase to phase insulation depending on the winding construction and the number of coils positioned in a slot in the stator core. However, the most critical insulation for the coil windings of a stator element is the ground wall insulation layer or layers that surround each coil used in the stator core element. The ground wall insulation electrically insulates the coil windings from the stator core sections in which the coil windings are installed. Such ground wall insulation layers may utilize wrapped tape layers having resin components that are then cured or otherwise heat treated to form the ground wall insulation structure.

The ground wall insulation is the most critical insulation component utilized in the stator, particularly for medium voltage and higher voltage machines. As a result, the ground wall insulation takes up a significant amount of the space in various slots in the stator core where the coil windings reside. Physically large insulation layers increase power losses and negatively impact power density in the stator core. Additionally, the ground wall insulation often involves mica layers and thus introduces a thermal insulation barrier between the coils thus hindering the cooling process for the coils. This further negatively impacts power density in the system. Still further, there are voltage stress risers that are associated with the core-coil interface which presents weak spots in the insulation system. As a result, medium voltage and higher voltage power systems generally cost more because of the necessary ground wall insulation and yet have lower power density. Furthermore, the systems are not readily adaptable from voltage class to voltage class.

Therefore, there is a need in the art to reduce the dominant electrical insulation function of the ground wall insulation and to simplify insulation design in generator production. It is further desirable to reduce or eliminate the thermal insulative effects of the ground wall insulation layers. Still further, if the amount of insulation in a stator core slot may be reduced, not only is the cost of the expensive insulation process reduced, but also an additional amount of copper can be loaded into the available slot spaces for the coil windings in a stator core, to increase power density of the stator core and generator. Furthermore, if the effect and consideration of the ground wall insulation layers can be reduced, the coil design and fabrication process may be decoupled from the voltage rating for the generator, thus providing greater design latitude across various generator power levels. It is therefore an objective of the present invention to address the concerns and needs in the art, as noted, and to improve the insulative properties and design of the stator core configuration.

SUMMARY OF THE INVENTION

In one embodiment of the invention, a wind turbine includes a generator with a stator and a rotor mounted for providing electrical power to an electric grid. The wind turbine has a stator having a core with a plurality of individual adjacent segments coupled together for forming a segmented core. A concentrated winding element is wound around each stator core segment for generating flux in the core segment. An insulation element is positioned between adjacent core segments for electrically isolating adjacent core segments from each other. For example, the insulation element may include a sheet of insulation material positioned between adjacent core segments.

In another embodiment, the stator core is in the form of a ring structure and includes an outer radial edge and an inner radial edge. The insulation element may extend a distance beyond the outer edge or a distance beyond the inner edge, or both. The dimension of one or more of the core segments at an outer edge of the stator ring may be increased relative to the core segment.

In one embodiment, the stator core segments form a stator ring structure. The stator core provides electrical power in multiple phase signals and all of the multiple phase signals are handled within the stator ring structure. In another embodiment, the stator core segments form a plurality of ring structures. Each ring structure handles a respective single phase signal of the multiple phase signals.

In another embodiment, the stator winding elements are coupled to the core segments through a high impedance connection. The core segments and concentrated winding elements for a respective phase signal are serially coupled with each other in the ring structure.

DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

The present invention will now be explained in further details. While the invention is susceptible to various modifications and alternative forms, specific embodiments have been disclosed by way of examples. It should be understood, however, that the invention is not intended to be limited to the particular forms disclosed.

Figure 1:
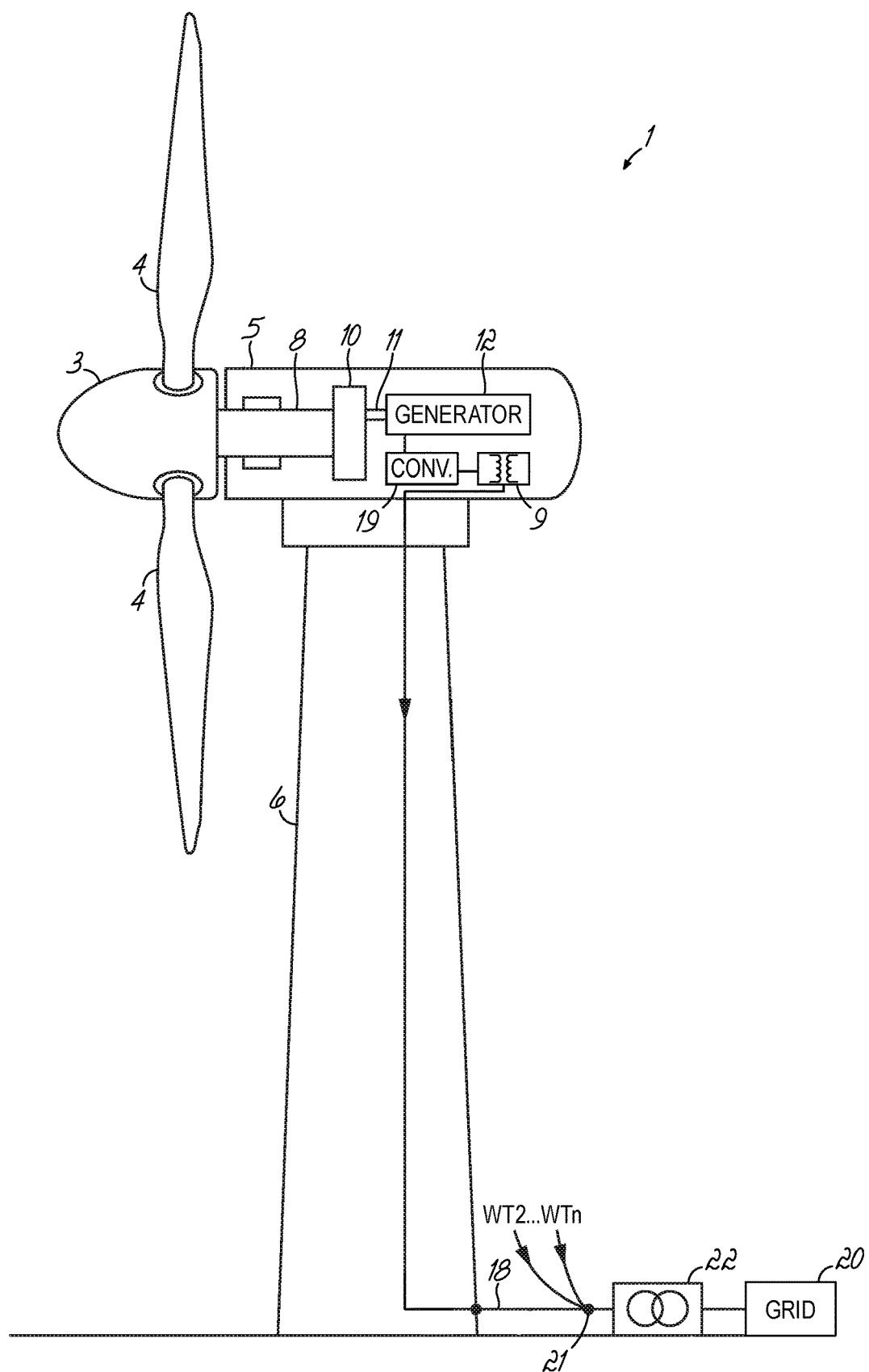
FIG. 1 is a perspective view of a wind turbine having a tower and an energy generator.

FIG. 1 illustrates an exemplary wind turbine system 1 for generating electric power in accordance with features of the invention. The wind turbine system or wind turbine 1 could be one of a plurality of wind turbines of a wind power plant. The turbine includes a tower 6, a nacelle 5 disposed at the apex of the tower 6, and a rotor assembly 3 operatively coupled to a generator 12. The rotor assembly drives the generator via a main shaft 8, a gearbox 10 and a high speed gear shaft 11, all housed inside the nacelle 5. Other embodiments might be coupled the generator 12 and gearbox 10 together in one block. In addition to the generator 12 and gearbox 10, the nacelle 5 may house various additional components, such as a convertor 19 and/or transformer 9 needed to convert wind energy into electrical energy and to operate and optimize the performance of the wind turbine 1. The tower 6 supports the load presented by the nacelle 5, rotor assembly 3, and other wind turbine components housed inside the nacelle 5 and operates to elevate the nacelle 5 and rotor assembly 3 to a height above ground level or sea level, as may be the case, at which air currents having lower turbulence and higher velocity are typically found.

The rotor assembly 3 may include a central hub and a plurality of very long blades 4 that are attached to the central hub at locations distributed about the circumference of the central hub. In the representative embodiment, the rotor assembly 3 includes three blades 4, however the number may vary. The blades 4, which project radially outward from the central hub, are configured to interact with passing air currents to produce rotational forces that cause the central hub to spin about its longitudinal axis. The design, construction, and operation of the blades 4 are familiar to a person having ordinary skill in the art of wind turbine design and may include additional functional aspects to optimize performance. For example, pitch angle control of the blades 4 may be implemented by a pitch control mechanism (not shown) responsive to wind velocity to optimize power production in low wind conditions, and to feather the blades if wind velocity exceeds design limitations.

The generator 12 (e.g. induction or synchronous generator) produces electrical output power of a frequency related to the rotation speed of the rotor 3, which is converted to grid frequency (e.g. about 50 or 60 Hz) by power converter 19. The voltage of the electric power thus produced is up-transformed by a transformer 9. The electric power from the wind turbine 1 and from the other wind turbines WT2, WTn of the wind power plant is fed into a wind power plant grid 18 and is connected at a point of common coupling 21. The power may be optionally further stepped up through transformer 22 to a wind power plant external electrical utility grid 20. A control system for the wind turbine includes a wind-turbine controller (not shown) that is coupled with a power plant controller that controls operation of the individual wind turbine generator 1 and other wind turbines wind turbines WT2, WTn of the wind power plant.

Figure 2:
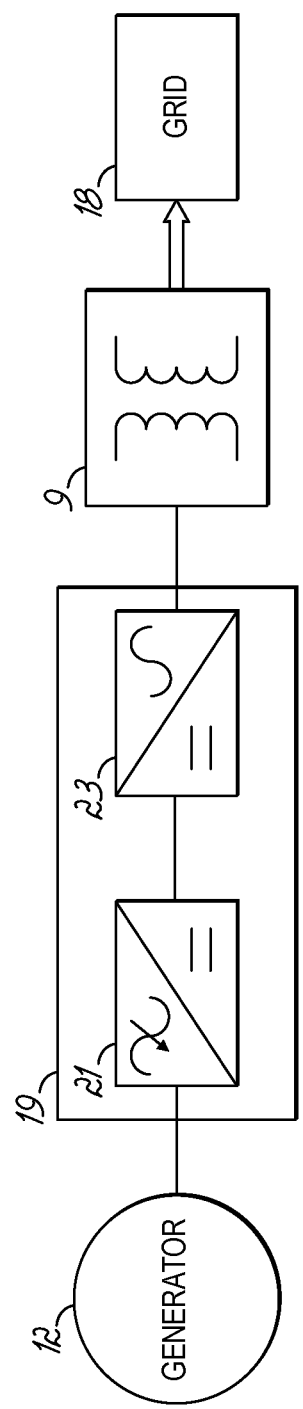
FIG. 2 is a schematic view of functional components of a wind turbine power system.

FIG. 2 is a schematic view illustrating an exemplary wind turbine electrical generator system for use in a wind turbine 1. Such an electrical generator system is generally configured with a convertor 19 that provides the synthesis of a 3-phase sinusoidal excitation. The frequency converter 19 converts the power in two steps. First the variable frequency power produced by the generator 12 is converted into DC power in a machine side inverter 21. The DC power is fed through a DC bus to a grid side inverter 23, which inverts the electrical power to AC power at the grid frequency 50 Hz or 60 Hz. The voltage of the convertor and generator system is matched in order to provide an optimum combination of solid state devices and generator machine voltage rating. For example, the system might typically provide a voltage in the range of 700-3300 line to line rms voltage. The output of the convertor 19 is fed to a step-up transformer which increases the output voltage to a level suitable for direction connection to the grid 18 and associated distribution system and may typically be greater than 10 kV. In accordance with one aspect of the invention, the unique stator construction permits the wind turbine generator design to be configured for higher voltage ratings without impacting the coil construction and insulation system. This satisfies a growing interest in utilizing higher voltage generators in order to reduce the current rating that is need for power cables and circuit breakers in the system, so that the system may handle power demands, which may exceed 10 Mega Watts for some wind turbine generators.

Figure 3:
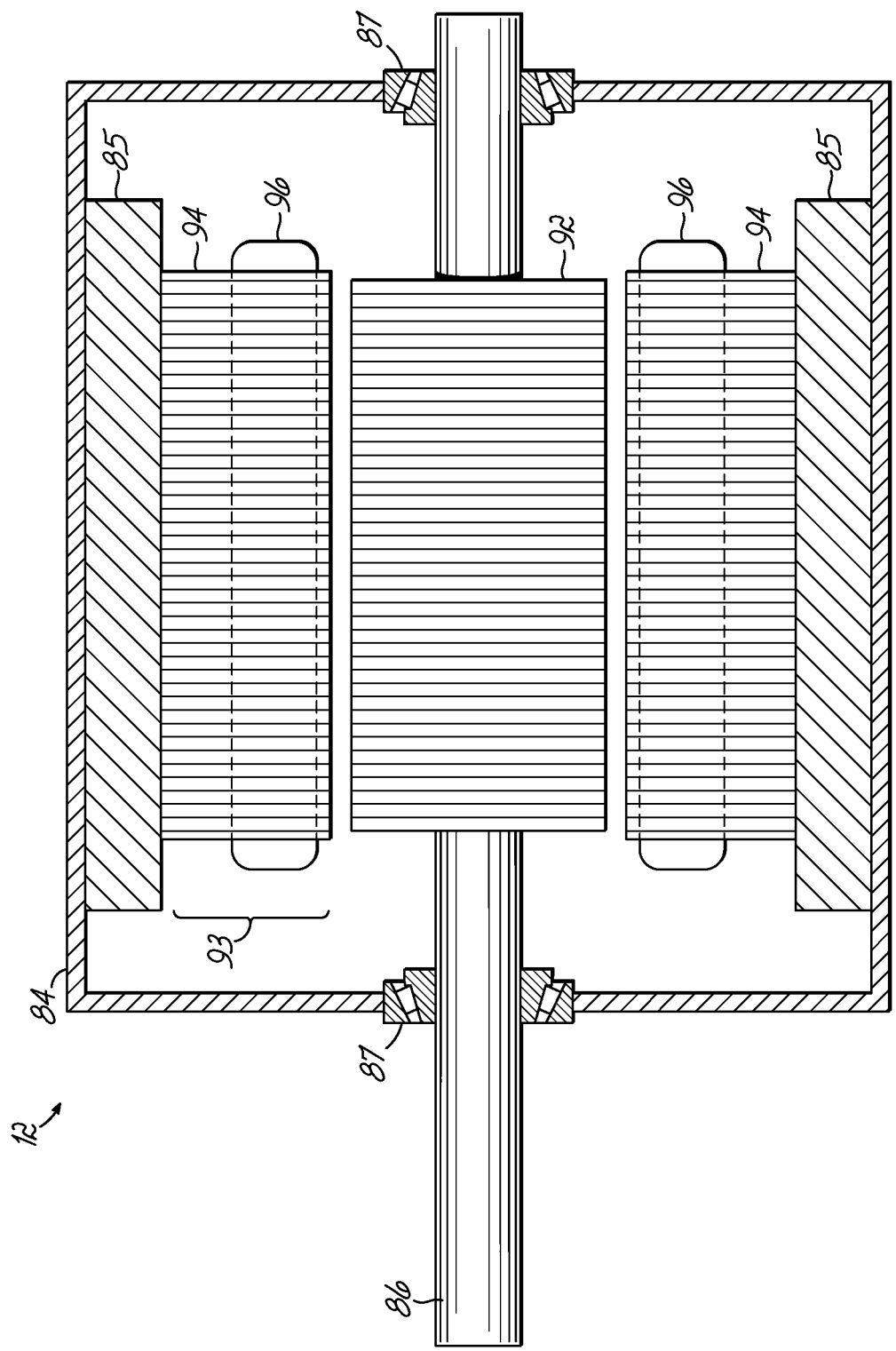
FIG. 3 is a perspective view of a rotor and stator assembly of a wind turbine power system.

FIG. 3 illustrates an exemplary electrical generator 12 that has a housing or frame 84, that is typically grounded. A stator sub-assembly 93 is mounted to the housing 84 by a stator support element 85. The housing 84 also supports the rotor and various other elements of the generator and is the structure by which the generator is attached to the nacelle or foundation. The stator support element 85 may be metal or, for one embodiment of the invention as described herein, may be comprised of insulating elements. A rotor 92 is arranged to rotate in the housing 84 and inside the stator sub-assembly. The rotor 92 generally includes a laminated core, magnets, and/or its own windings (not shown). The rotor 92 is attached to a drive shaft 86, which is supported in the housing to rotate by bearings 87. The rotor and shaft freely rotate within the stator sub-assembly, within a well-controlled air gap between the rotor and stator sub-assembly. Rotational forces are imparted onto shaft 86 by the torque of the wind turbine and the rotating blades 4 of the rotor assembly 3. The stator sub-assembly 93 includes a stator core 94, typically comprised of a laminated stack of electrical grade steel, and a set of conductive coils 96 referred to as windings. As the rotor 92 rotates within the stator, the electricity is generated in the windings 96 and transmitted to a frequency convertor as shown in FIG. 2. The system might also include appropriate breakers and filters and other components (not shown) as would be understood by a person of ordinary skill in the art to ensure the proper operation of the generator.

In a three phase generator, as discussed herein in the examples, the line-to-ground voltage is the difference of potential between an individual phase of a winding and the ground. A three phase system contains the three line-to-ground voltages, one from each phase winding. The line-to-neutral voltage denotes the difference of potential between an individual phase terminal in the stator and the neutral point of the phase connections (e.g. star point in a Y-connected system). Hence, a three phase system contains the three line-to-neutral voltages. The line-to-line voltage is the difference of potential between two phases of a multi-phase system. Here, this voltage refers to the voltage measured at the terminals. The windings are insulated in the stator construction. As noted, the ground wall insulation is the most critical insulation component utilized in the stator. The ground wall insulation has the primary feature of isolating the various phase windings from each other via the conductive metal core.

In accordance with one embodiment of the invention, the stator core is segmented and the coil windings are arranged in a concentrated winding arrangement wherein each stator segment or tooth includes its own dedicated or concentrated phase winding as discussed and disclosed further herein.

Figure 4:
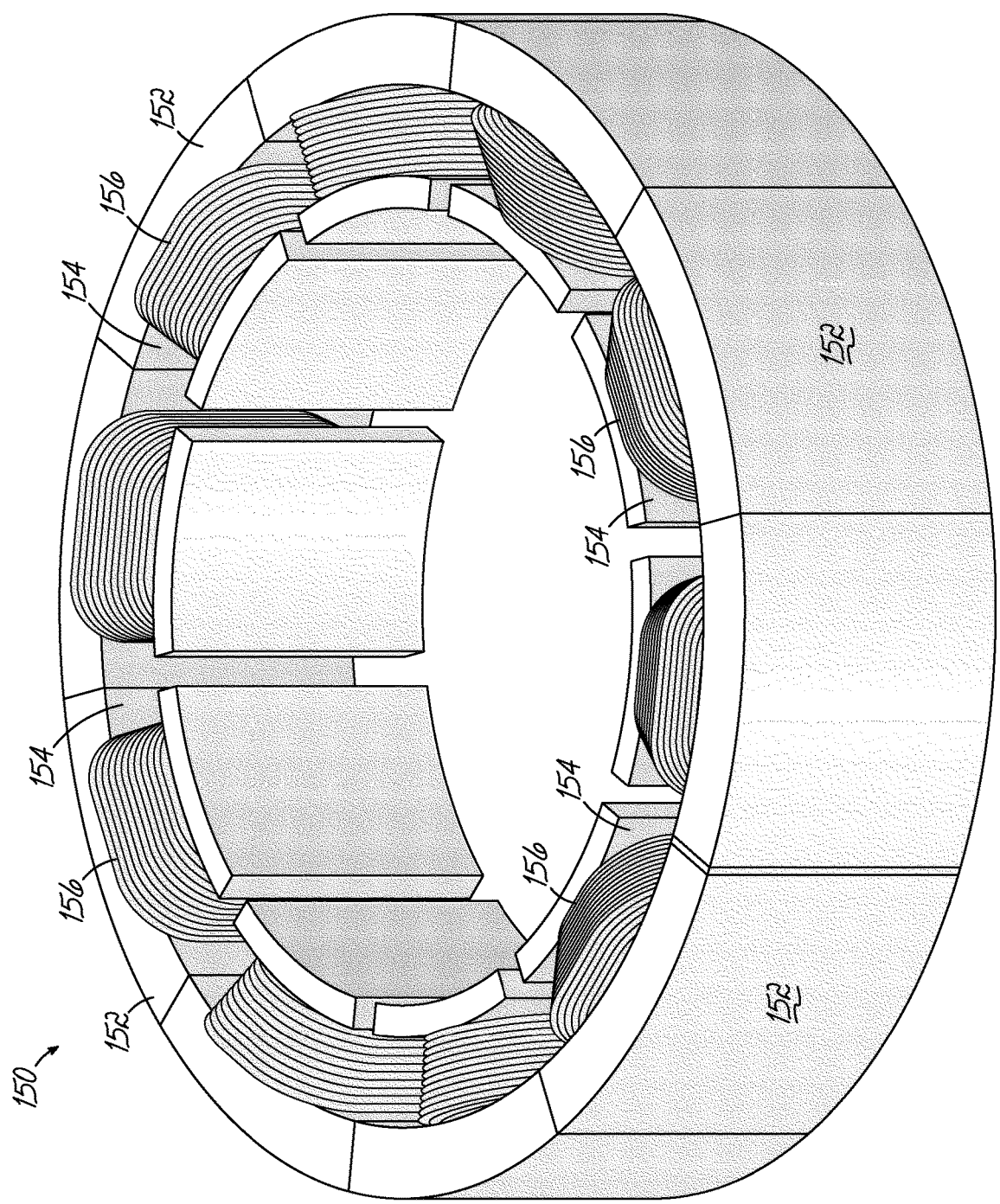
FIG. 4 is a perspective view of a segmented stator core element in accordance with an aspect of the invention.

In accordance with one embodiment of the invention, a segmented core having concentrated windings is used for the invention. Specifically, a segmented stator construction is utilized which incorporates a plurality of individual stator segments or teeth that operate together to form the stator core. Then concentrated windings are arranged on each of the separate core segments or teeth such that each segment includes its own dedicated winding element. The winding elements or windings are located close to the core segments and specifically are wound tight around the core segments/teeth for a tight fit for each winding for better capacitive coupling from the windings to the core. FIG. 4 illustrates an example of a segmented stator core wherein the stator assembly 150 incorporates a plurality of individual, side-by-side stator core segments 152, which are arranged to form a generally circular ring structure. The various stator core elements or teeth 152 are positioned side-by-side in a stator ring structure and form slots 154 therebetween for receiving the various coils or windings 156. The stator core ring structure provides electrical power in a plurality of phases. Pursuant to the concentrated winding design implemented in accordance with an aspect of the invention, each of the stator core segments 152 will incorporate a concentrated coil winding and each particular winding is associated with a phase group for the wind turbine generator. For example, for one embodiment of the invention disclosed herein, the stator core ring structure handles all of the phases or phase signals of the electrical power in a single ring structure and each of the various concentrated windings and stator segments might alternately be incorporated with a different phase signal, U, V, or W around the ring structure of the stator core 150. The stator core and various stator core segments 152 may be formed by various lamination layers, as would be understood by a person of ordinary skill in the art. The stator assembly 150 operates in conjunction with a rotor element that rotates inside the ring forward by the stator core for the generation of electricity as is well known and discussed herein. In another embodiment of the invention as disclosed herein, the core segments form a plurality of ring structures wherein each ring structure handles a specific phase signal.

Figure 5:
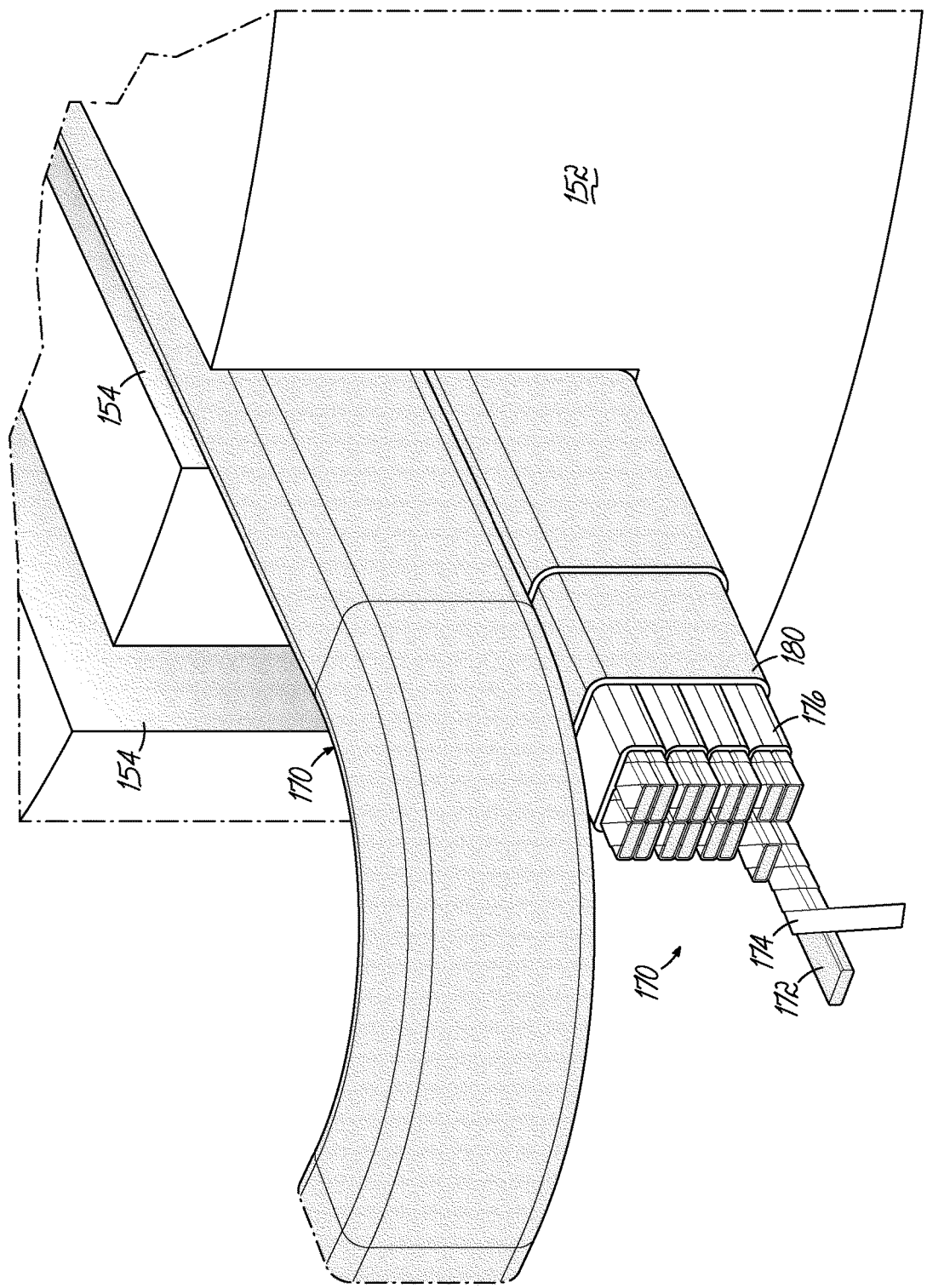
FIG. 5 is a perspective view, in partial cross-section of a portion of coil windings in a stator core element showing conventional insulation.
Figure 6:
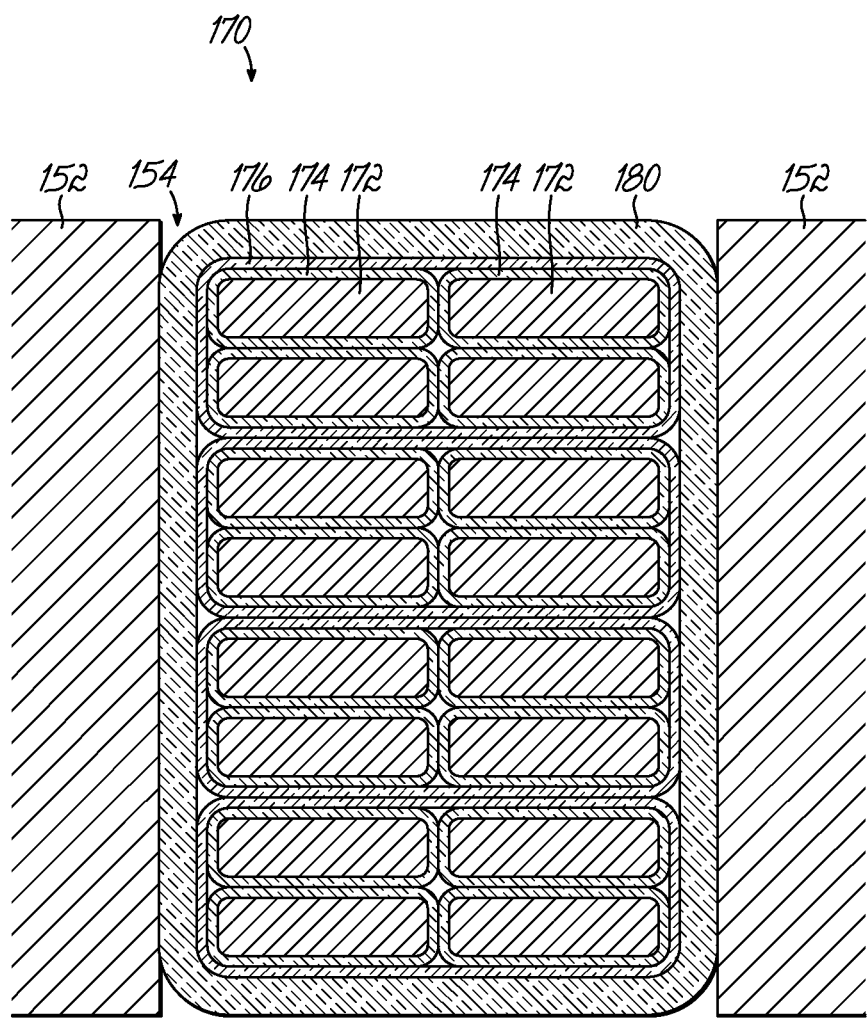
FIG. 6 is a cross-sectional view of a coil turn in a coil winding of a stator core element.

The coil windings 156 for each core segment 152 are generally form wound coils comprising a plurality of stacked insulators wound around the segments as illustrated in FIG. 5. The coils are electrically insulated from the core segment with additional layers in the construction of the coil conductor. Specifically, referring to FIG. 5, a plurality of coil elements 170 are shown wound and arranged within the suitable slots 154 of the various stator core segments 152. As illustrated, each of the coils includes windings from a plurality of individual conductors 172, generally copper, that are formed in a stacked array to form a singular winding turn 170. Each of the conductors or strands 172 may be individually insulated with a layer of strand insulation 174 and further, each of the groups of strands forming a particular coil winding turn might also be insulated with a turn layer of insulation 176. However, as discussed herein, the predominant amount of electrical insulation of the coil windings is provided by a ground wall insulation layer or layers 180 which surround the entire coil each of the coil turns 170 and electrically insulates the total coil from the core element 152. FIG. 6 shows a cross-section of a turn 170 showing the insulation components.

Figure 7:
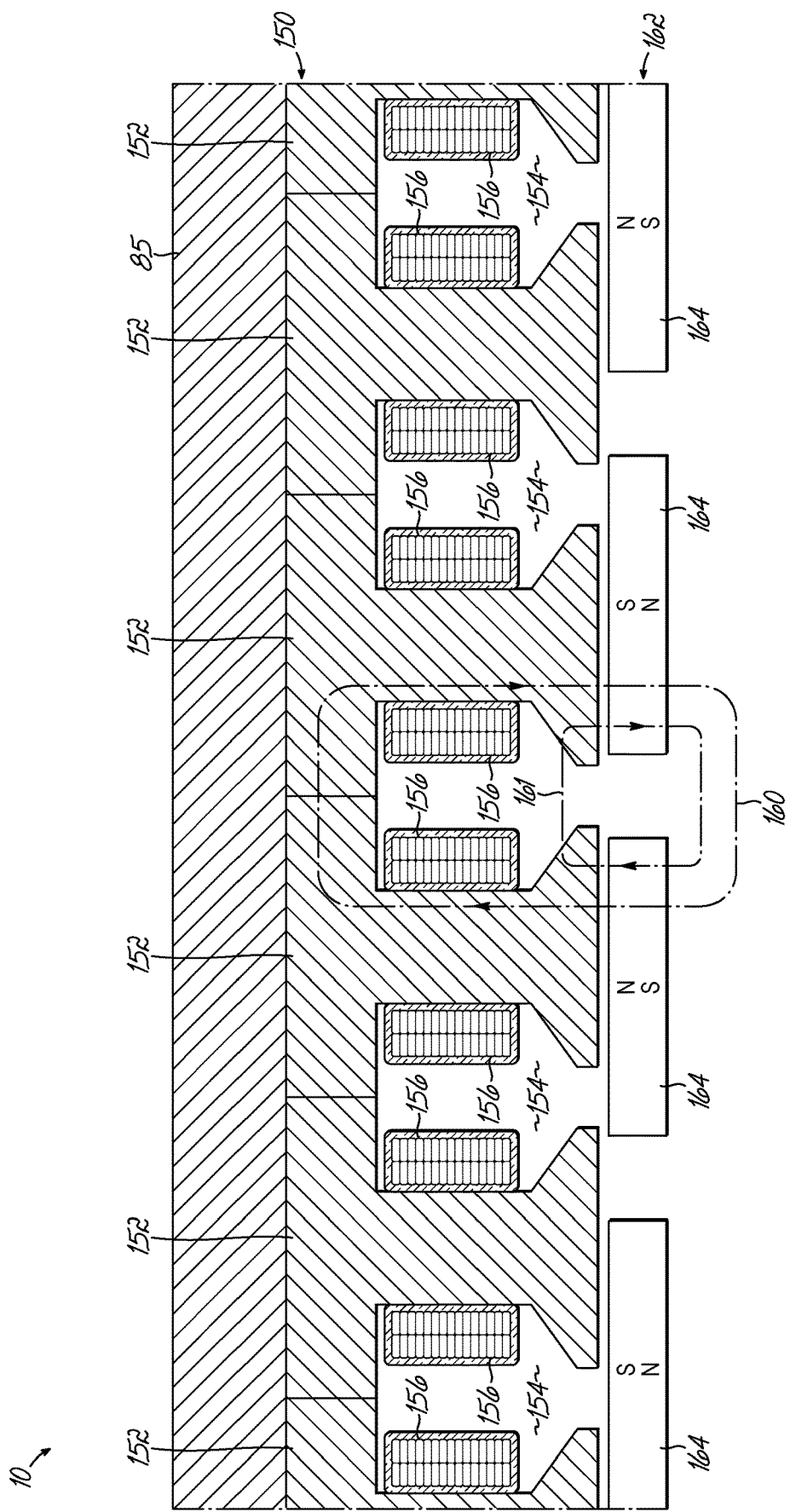
FIG. 7 is a cross-sectional view of portion of a segmented stator core element as in FIG. 4. in accordance with an aspect of the invention.

FIG. 7 illustrates a radial cross-section of the stator core 150 showing the individual and separated stator core segments 152 with concentrated windings for implementation in the invention. The stator assembly 150 incorporates a plurality of individual, side-by-side stator core segments 152, which are arranged to form a generally circular stator core ring. The stator core elements 152 are mounted to a stator support element 85 or other portion of a larger housing and are positioned side-by-side in a stator ring with the various coil windings 156 wound around each stator core segment 152 within the slots 154. For simplicity, a single coil 156 is illustrated for each core segment in the concentrated coil arrangement. As is understood by a person of ordinary skill in the art, the various stator core segments 152 are constructed and arranged for containing the main portion of the generated magnetic flux 160 within the stator core for the generation of electricity as a rotor 164 rotates within the stator core 150. As also will be understood, there will be a certain amount of leakage flux 161 as well within the stator core. The separate stator core elements and concentrated windings are utilized with the inventive insulative features of the invention for electrically isolating the stator core segments 152. As will be appreciated, the layout in FIG. 7 shows a section of the stator core 150 and as will be readily understood, the stator core elements will generally be arranged in a circular ring as illustrated in FIG. 4.

In accordance with one embodiment of the invention, the unique insulation arrangement moves the ground wall insulation aspects of the core to the segments of a segmented core having concentrated windings. Specifically, insulation is positioned between each of the segments or teeth of the segmented core. The concentrated windings are arranged on each of the separate core segments. As noted, because the ground wall insulation 180 is the largest single component of the stator insulation system, the ground wall insulation presents various drawbacks and can be particularly limiting in the design of a wind turbine generator, particularly for medium voltage and higher voltage machines. It is therefore one aspect of the present invention, to decouple the interdependency between the stator coil insulation and the ground wall insulation and to shift the dominant electrical insulation function from the coil ground wall insulation to between the individual core elements or segments. In that way, the coil insulation is simplified and decoupled from the overall machine voltage rating. Furthermore, the thermal insulation effects of the coil insulation are reduced or eliminated. Still further, by reducing the packaging factor within the slots of the stator core power density can be increased.

As may be appreciated, the advantages of the present invention also reduce the cost of fabrication of the stator element, since the electrical ground wall insulation can be quite expensive, and so for higher voltage machines, the increased amount of ground wall insulation required can significantly increase the overall cost of the machine. The present invention decouples the coil fabrication process and design from that of the voltage rating of the overall machine. An additional advantage of the present invention is that the insulation between the cores and the cores themselves can be done with rigid or sheet insulation that does not have to be conformable with the windings and is not critically dependent on resin impregnation as our current designs which implement resin components for such conformality. The isolated core segments also reduce stray current injection into the stator housing and associated system ground.

Figure 8:
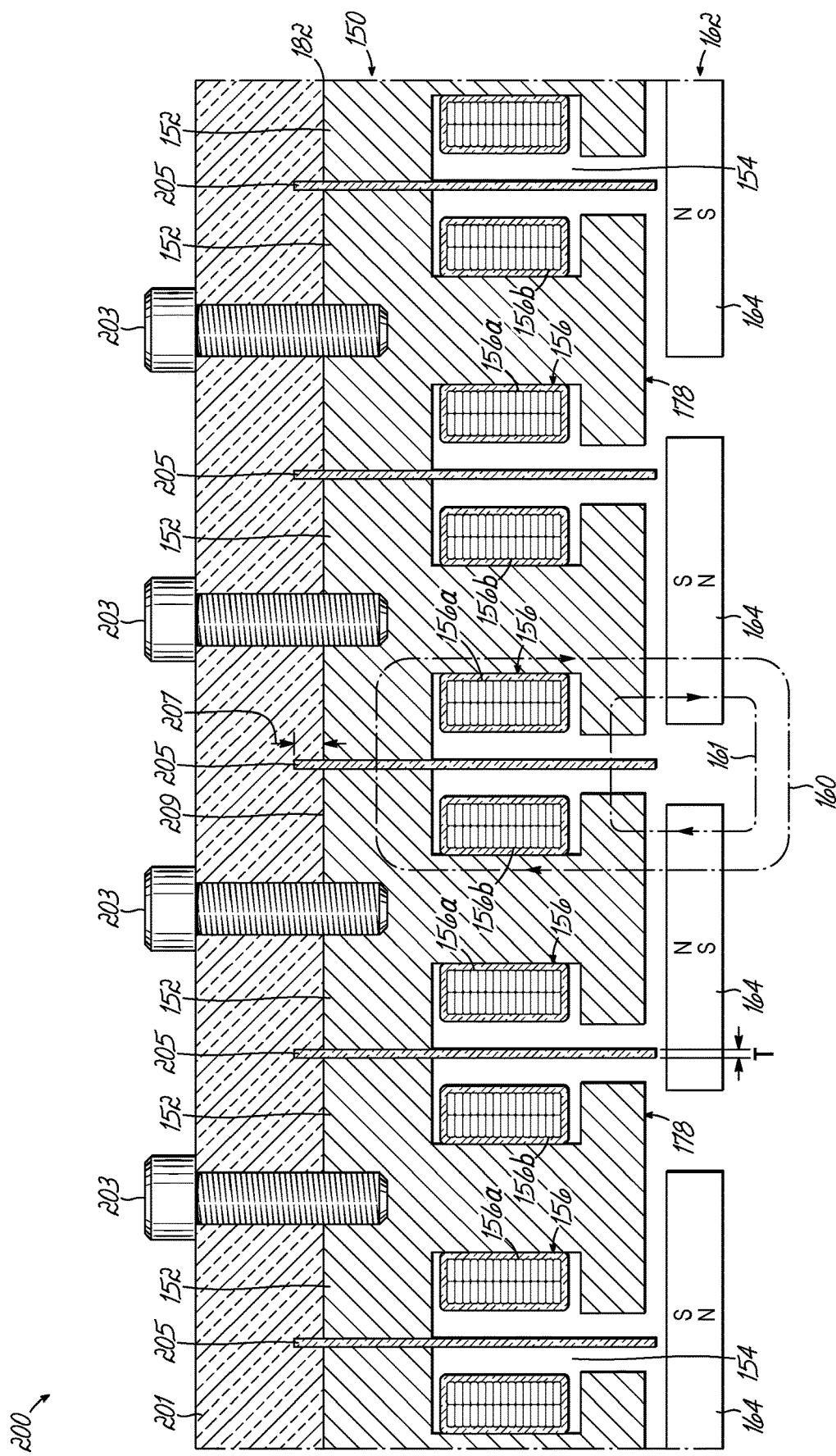
FIG. 8 is a cross-sectional view of a portion of a segmented stator core element illustrating core segments insulated in accordance with an aspect of the invention.

Referring to FIG. 8, an embodiment of a stator core assembly 200 in accordance with features of the invention is illustrated implementing a segmented stator core 150 having a plurality of individual stator core segments 152 arranged in a segmented construction. Concentrated winding/coil elements 156 are used in the stator. The stator core 150 is coupled with a stator support element 201 or other portion/element that is coupled to the generator housing (See FIG. 3). In one embodiment, the stator support element is an electrically insulative element. In one embodiment the stator core 150, 250 is coupled with a stator support element 201 that is coupled to the generator housing, wherein the stator support element 201 is an electrically insulative element.

In one embodiment the stator support element 201 and each stator core segment 152, 202, 260 are electrically isolated from each other. Such electrically isolation can be achieved by a sheet of insulative material that is configured and dimensioned to separate and electrically insulate the elements from each other.

As will be appreciated, the stator core 150 may be coupled with a number of other different structures or a frame for appropriately mounting the stator core into the generator, and thus the present invention is not limited to that illustrated within FIG. 8 or other figures herein. As shown in FIG. 8, each of the individual segments might be specifically individually mounted to support element 201 through bolts 203 or other appropriate fasteners to form a stator ring having the segmented design used in the invention.

In an embodiment the bolts 203 are insulated from either the individual segments 152 or from the support element 201 or both. Thereby the electrical potential of the individual segments 152 may not need to be the same. In an embodiment the insulation can be achieved by an insulated bushing in the bore arranged for receiving the bolts.

As shown, each of the stator segments 152 includes a concentrated coil or winding element 156 around each stator segment 152. For example, as shown in FIG. 8, in cross-section, the winding element 156 includes coil segments 156a and 156b representative of a continuous concentrated coil winding around each stator segment 152. As discussed, the power generation aspects of conventional wind turbine machines are still dependent on the ground wall insulation between the coils and the core. In the present invention, segmented stator elements 152 and the unique inventive insulative isolation of those stator segments provides the various benefits as noted herein in combination with other features of the invention as disclosed. Therefore, in accordance with one aspect the invention, each stator segment or tooth 152 includes its own concentrated coil windings. Single turns of the core 156 are illustrated for simplicity in FIG. 8, but it will be understood that coil 156 may have multiple turns making up coil 156.

In accordance with one aspect of the invention, insulation is moved to the individual core segments thus forcing each of the stator core segments to be at the same average voltage as the coil around it. To that end, each segment 152 is electrically isolated from the adjacent segments utilizing an insulation element. In one embodiment, the insulator element is a sheet 205 of insulative material that is configured and dimensioned to separate and electrically insulate the stator core segments 152 on either side of the segment. The sheet 205 is dimensioned to extend from top to bottom in the stator core, as well as from an inner radial surface to an outer radial surface of the stator core in order to fully insulate each segment 152 from adjacent segments. In that way, the primary insulation for the stator core is shifted from the coil-to-core boundary and the ground wall insulation to the core segment-to-core segment boundary as illustrated in FIG. 8. This forces each core segment to be at the same average voltage as the concentrated winding/coil that surrounds the core segment. To provide the electrical insulation between the core segments, a thin layer 205 of insulation material is arranged between each core segment 152. Layer 205 extends radially from the structure 201 to a distance up to or slightly past the radial inside edge or inside diameter 178 of the stator core 150 as illustrated in FIG. 8. In the embodiment illustrated, the insulation also may extend up into the support element 201 as shown. Alternatively, the insulation layer 205 might go up to the interface 182 formed between the stator core and element 201.

As noted, the element 201 is insulative and may be coupled with the larger housing or frame structure (See FIG. 3) that will be electrically grounded similar to the stator core 150 and may be formed of an appropriate laminated stack construction. As will be appreciated, there are a number of ways the stator might be mounted to a support structure 201 and many possible housing or frame constructions and thus the invention is not limited to one specific housing/frame structure or mounting arrangement for the ring of the stator core 153. For example, the individual core segments 152 might be notched or countersunk into appropriate shaped spaces within the support 201 for secure mounting.

In accordance with another aspect of the invention, as illustrated, the layer or sheet 205 of insulation material may extend into the element 201, such as for the prevention of flashover between the stator core segments 152. For example, the layer 205 may be configured and dimensioned to extend a distance 207 beyond the outer diameter or outer radial edge 209 of the stator segment 152 and past interface 182 and into the material of support element 201, for example.

Similarly, layer 205 may be dimensioned in the radially inward direction to extend a distance beyond the inner radial edge 178 of the stator core and individual stator segments that it separates. Specifically referring to FIG. 8, the layer 205 may be dimensioned as illustrated at edge 178 to extend beyond a radially inward edge 178 of the individual stator segments 152. By extending beyond the inner edge or diameter of the stator segments, the insulation layer 205 ensures electrical isolation and containment of the flux within the stator segment and may reduce the leakage of flux 161 as illustrated. The insulation layer 205 may be sufficiently rigid or formed of a rigid sheet of insulation material to provide for the proper radial extension into each of the slots 154 as well as the extension beyond the inner and outer diameters of the stator core.

In accordance with one aspect of the invention, the layer 205 of insulation material may have various thicknesses as desired. In one embodiment of the invention, a layer having a thickness T of 0.5 millimeter might be implemented. Other thicknesses might also be utilized. The present invention and the unique radially extending electrical insulation layer between the individual stator segments provides for the ability to use a number of different phenolic insulation sheet materials, such as blends of Nomex® and Kapton® materials, such as a Nomex®-Kapton®-Nomex® (N-K-N) materials or a Nomex®-Kapton® (N-K) materials might be utilized. Such materials may be formed in a phenolic paper or epoxy glass-based laminate that may be cut to the appropriate shape at an appropriate thickness for the purposes of the invention. Such materials may be in a temperature class greater than 200 degrees Celsius and have a dielectric rating of around 50 KV per millimeter (mm). Such materials are generally low-cost, thus providing significant savings versus resin-based around wall insulation products. Furthermore, the implementation of a layer 205 of insulation material at the boundaries of the separated core segments 152 frees additional space within the slots 154 for coil conductor material, for improved power density within the generator.

In accordance with another aspect of the invention, in addition to the use of insulation layers between isolated stator core segments and the concentrated windings, an electrical connection is provided between the individual coil elements, or series of coils and the core. Specifically, the concentrated winding elements are coupled to the core segments through a high impedance connection. Also, the core segments 152 and concentrated windings 156 are serially coupled with each other for a specific phase. More specifically, referring to FIG. 9, a stator arrangement 200 is illustrated showing individual elements reflective of isolated stator core segments 202. Each of the core segments 202 includes a concentrated coil winding 204 associated with that segment 202. Each of the segments 202 is isolated from adjacent segments through the layer/sheet 206 of insulation material to provide electrical isolation between adjacent stator segments.

Figure 9:
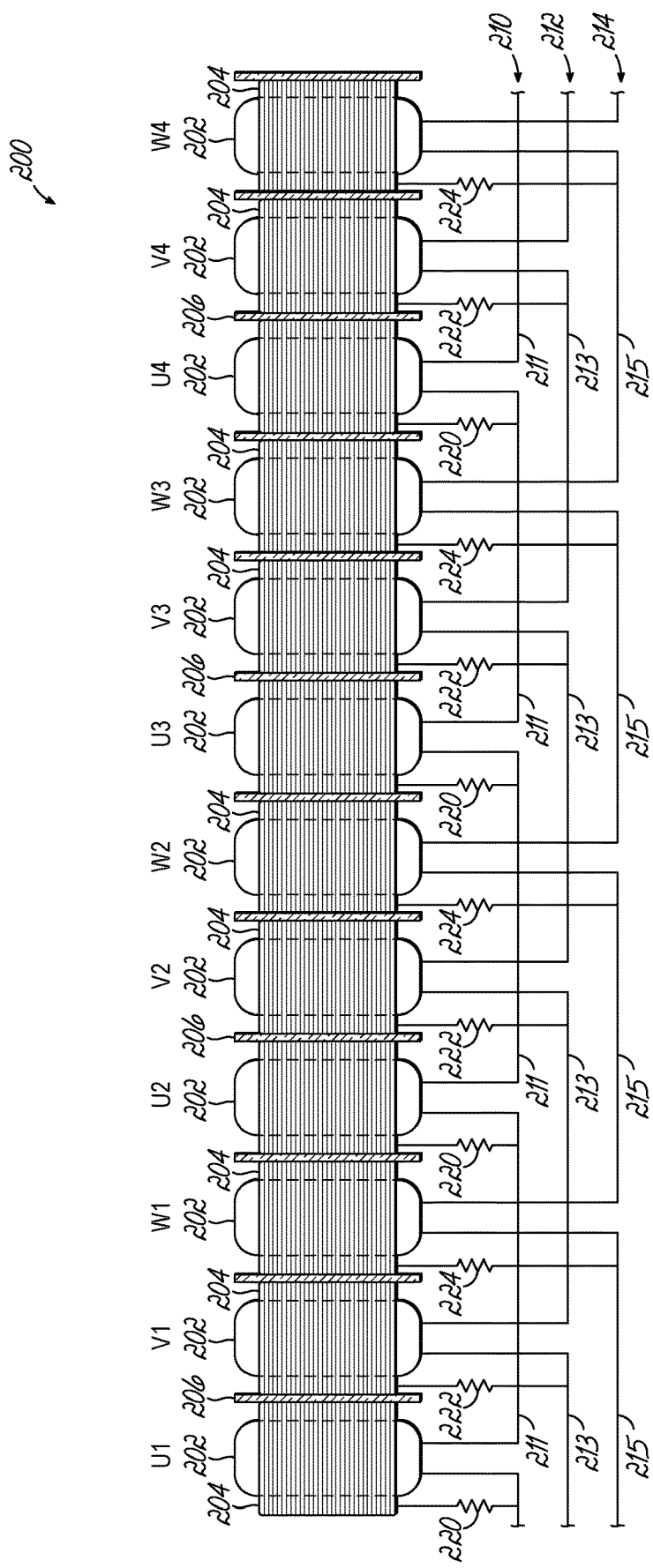
FIG. 9 is a schematic view of a portion of a segmented stator core element illustrating the electrical connection of the core windings and core segments in accordance with an aspect of the invention.

In the embodiments of a stator core 200 illustrated in FIG. 9, the individual stator core segments 202 and specifically, their affiliated concentrated coil winding 204 is reflective of one of the phase signals U, V, W associated with the three phase wind turbine generator. For the stator core 200, the particular phase signal is repeated in the core ring sequence as illustrated by U1, U2, U3, U4, V1, V2, V3, V4, etc. for each of the phases U, V, W. In accordance with an aspect of the invention, as indicated by lines 211, 212, 214, 215 each of the individual stator segments for a phase are serially coupled together around the stator core ring along with respective high impedance connection between the respective coils and their core segments 202.

Specifically, referring to line 211, the initial stator core segment 202 indicated for phase U1 is coupled to its respective coil element 204 through what is indicated as a resistive element 220. The resistive element 220 is reflective of a high impedance connection between the stator core segment 202 and the coil element 204. Alternatively, the impedance element 220 could be reflected by an RLC (Resistor, Inductor, Capacitor) network to provide the high-impedance core-core connection. Accordingly, the symbolic illustration of the high impedance electrical connection or network 220 coupling the stator core segment 202 and coil element 204 is not limited by the illustrations.

In another aspect the invention, each of the individual stator core segments 202 are also coupled serially together to other of the stator core segments for that similar phase in a distributed manner around the stator core. For example, as illustrated by lines 211 the individual core segments for phase signal U are all coupled together in a distributed arrangement so that segments 202 associated with the U phase signal are serially coupled together as shown. Furthermore, each of those lines 211 reflect a distributed electrical connection that also provides the high impedance network or connection 220 between the stator core segment 202 and the respective coil element 204. Similarly, lines 213 provide interconnection between the various stator core segments 202 for the V phase signal while also providing a high impedance connection between the respective coils through impedance connections 222 and connections 213. Still further, as noted by lines 215, the individual stator core segments for the W phase signal are serially coupled together through the connections 215. The visual coil elements 204 are coupled with the respective stator core segments 202 through impedance connections 224.

In accordance with the invention, the individual stator core segments 202 essentially electrically float up to the potential of the respective coil elements 204. The various coil elements can be connected in a series configuration as shown without a significant impact on the coil insulation properties and specifically the coil ground wall insulation. This thereby permits a more simplified scaling of the machine voltage to higher voltages that may be achieved without significant changes or increases in the traditional ground wall coil insulation. As noted with the embodiment of FIG. 9, all three phases of the generator are handled in a single ring construction of the stator. Such a single ring construction provides the ability to take advantage of serially distributed voltages within the stator. In such a case, the layers or sheets 206 of insulation material that electrically isolate the individual stator core segments 202 may be configured and adapted appropriately to provide the desired core segment-to-core segment insulation. The adaptation for the sheets 206 of installation material is relatively easy to make as you do not have to conform to the specific shapes of the windings and the specific coil element layouts, as does typical ground wall insulation.

FIG. 9 illustrates an embodiment of the invention wherein a stator core 200 in accordance with the invention provides that each of the various phase signals U, V, W are handled in alternating stator core segments 202 with concentrated winding elements 204 around the single or unitary stator core. In such a scenario, wherein all three phases are in a single stator core ring, the various layers/sheets 206 of insulation material must be configured and dimensioned to be able to handle the full line-to-line voltage.

Figure 10:
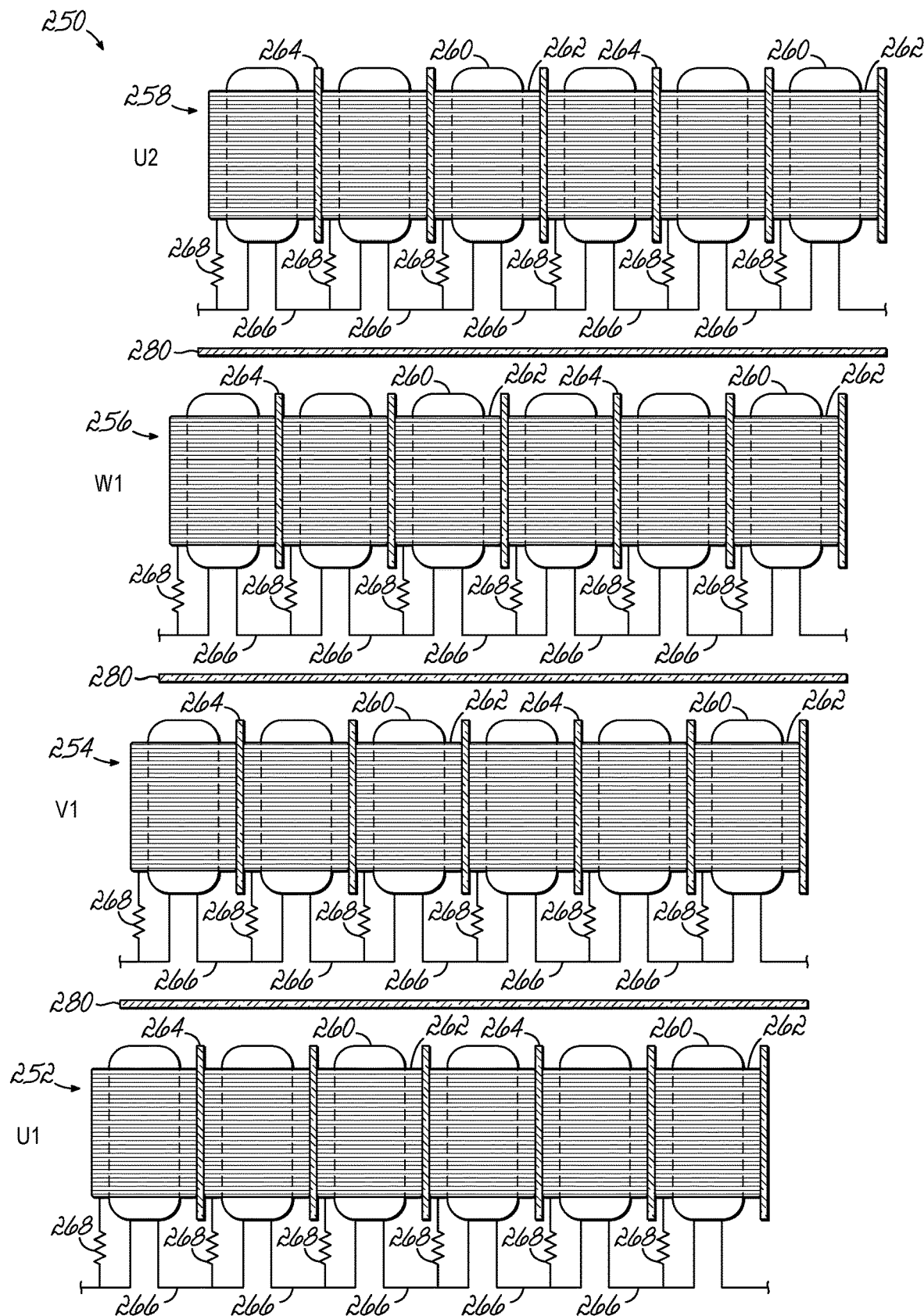
FIG. 10 is a schematic view of a portion of a staggered stator core elements illustrating the electrical connection of the multiple stator core windings and core segments in accordance with an alternative embodiment of the invention.

Alternatively, the individual phase signals might be handled through a stator having a plurality of staggered stator core ring structures or rings, each for the specific phase. That is, a single stator core ring is used for each of the separate phases. Such a stator topology is used to take advantage of serially distributed voltages in the stator. Specifically, referring to FIG. 10, a stator core arrangement 250 may be comprised of multiple stator rings 252, 254, 256, 258, wherein each of the stator rings handles a specific phase. Each stator core ring utilizes isolated core segments in accordance with the invention wherein each of the core segments is electrically coupled together for a single phase signal, and the respective winding elements for each of the core segments are electrically connected to the core segment within each ring through a high impedance connection. While FIG. 10 shows the various stator rings in a schematic sense, it will be readily understood as disclosed herein that such stator core elements would be arranged similar to the segmented configuration as shown in FIG. 4.

Referring to stator core 252, the individual core segments 260 and respective winding elements 262 are electrically isolated from adjacent core segments/coils by sheets 264 of insulation material in accordance with the invention. The individual core segments 260 are electrically coupled together in series, such as through a series connection through lines 266 as discussed herein. Also, each of the individual winding elements 262 is coupled to the respective core segment 260 through an appropriate high impedance connection 268. A high impedance connection or network 268 may be a suitable impedance network, such as an RLC network, for providing the desirable impedance between the winding element 262 and respective stator core segment 260. Since there is only one phase handled by each stator ring, each of the insulation elements or sheets 264 only needs to handle a portion of the phase voltage that is distributed over the stator segments.

Each of the stator rings 252, 254, 256 is coupled with a single phase signal U, V, W, respectively. For example, stator ring 252 may be coupled with U phase, stator ring 254 with the V phase, and stator ring 256 with the W phase. Although three rings are noted with particular phases, there may be additional rings that are also associated with a particular phase signal. For example, as shown by stator ring 258, that core ring may also be coupled with the U phase signal (U2). Similarly, there may be other V phase and W phase stator elements coupled with the core rings 254, 256, respectively. As illustrated in FIG. 10, in a stator arrangement, the various stator rings 252, 254, 256 will be staggered appropriately in degrees in the construction to account for the different phases in the stator.

Each of the core segments 260 for each ring is separated by the appropriate sheet 264 of electrical insulation material and are coupled together in series by appropriate connections 266. Furthermore, each of the coil elements 262 is coupled with the respective core segment 260 by the high impedance connection 268. As will be appreciated, the phase on the lines 266 for stator coil 252 is U, while for the other cons 254, 256, the phase in lines 266 will be V or W.

In such an arrangement, the individual sheets of insulation material 264 between stator segments only have to be able to handle the distributed voltage for a particular phase for that stator ring. However, the individual phases are isolated with separate stator rings and so the voltage between each of the stator rings 252, 254, 256 is the full line-to-line voltage.

As such, in the embodiment of the invention, another sheet of insulation material 280 is used between each stator ring and phase. The material 280 has to be dimensioned and configured to handle the full line-to-line voltage. Generally, because the rings are physically separated, the insulative features for the separate stator rings might be more easily handled. As noted herein, the single ring per phase topology is necessary in order to take advantage of serially distributed voltages.

The embodiment illustrated in FIG. 10 utilizing staggered stator rings provides an additional degree of design freedom with respect to the torque ripple and the voltage harmonics associated with the generator. Furthermore, segregating the phase signals to the separate stator rings reduces the voltage stress that exists between the alternating core segments when all the phases are handled in a single stator ring.

The unique shifting of the primary insulative features of a stator core to between the various core segments and segment-to-segment provides further advantages not possible utilizing conventional coil ground wall insulation. In addition to implementing a sheet of insulation which is formed of a rigid insulation material that is at a lower cost and more structurally robust, the arrangement provides for physical adaptation of the individual core segments so as to reduce electric field stress without specifically affecting the shape of the winding or the cross-section of the winding. For example, referring to FIG. 11, a stator ring assembly 300 is shown having individual core segments 302 as discussed herein that are isolated by layers or sheets 304 of insulation material between the various core segments having concentrated coil windings.

Figure 11:
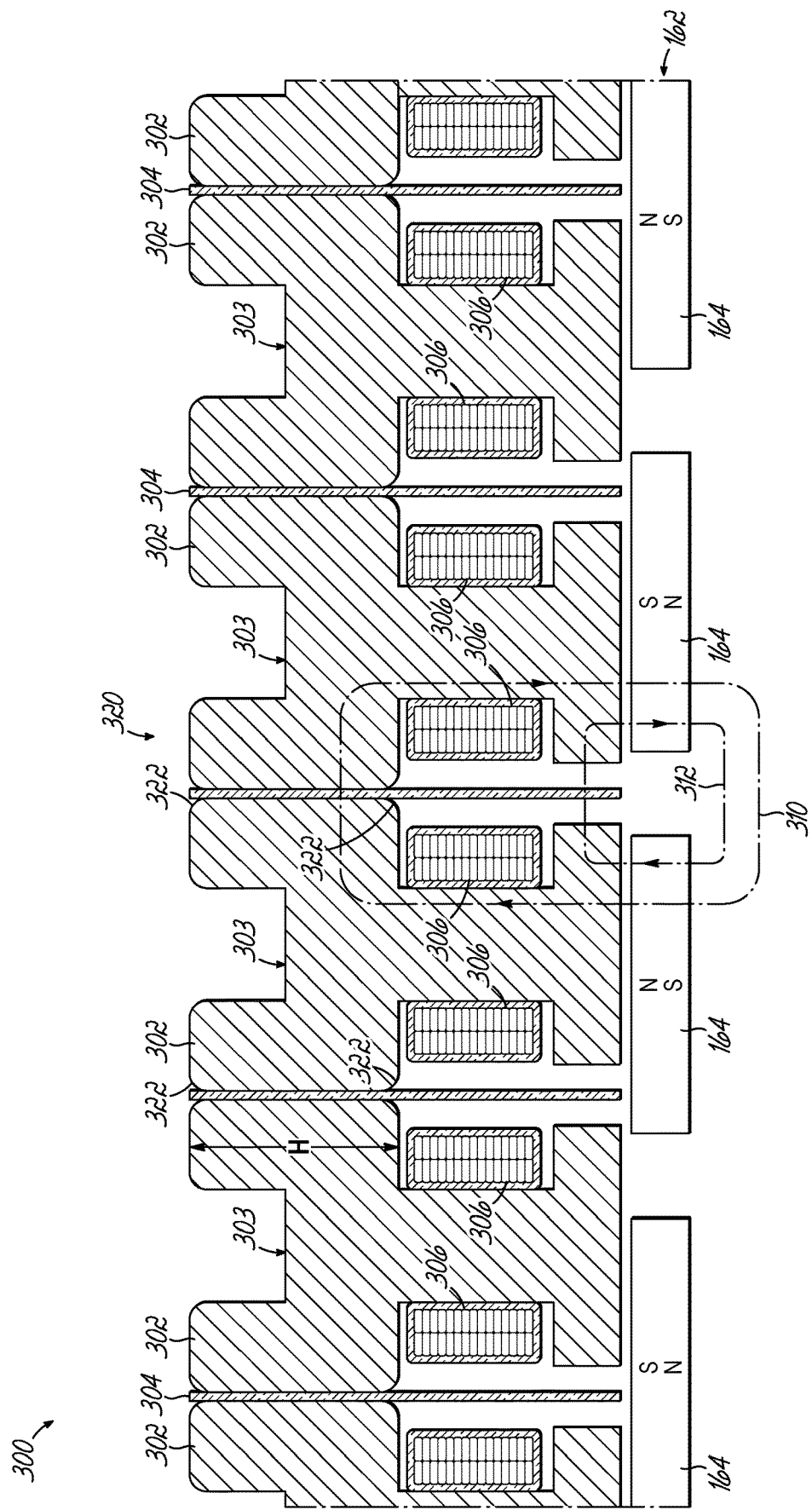
FIG. 11 is a cross-sectional view of a portion of a segmented stator core element illustrating alternative core segments insulated in accordance with an alternative embodiment of the invention.

As is known, the stator core 300 and the various core elements in accordance with the invention may be formed of laminated stacks of material for providing a highly permeable path for the magnetic field that is induced therein. As seen in FIG. 11, paths 310 and 312 indicate paths for magnetic flux and leakage flux, respectively, in the stator core 300. As may be seen, the sheet 304 of insulation material between each core segment 302 intersects the flux path. As a result, the sheet of insulation material can act as a flux resistor thus adversely affecting the flux path and flux flow in the stator core. In order to reduce the magnetic reluctance, and thus any flux leakage at the interface between the core segments 302 provided by the sheet 304 of insulation material, the core segments 302 can be shaped in accordance with an aspect of the invention to address magnetic reluctance without affecting the shape of the winding or the cross-section of the winding. More specifically, the dimension of one or more of the segments 302 out at the outer edge or outer diameter 320 of the stator ring structure 300 can be increased relative to the core segment so as to reduce the reluctance of the gap between each of the segments as defined by sheet 304 of the insulation material. For example, as seen in FIG. 11, the height H of stator segment 302 might be increased at the boundaries with the insulation sheet 304 relative to the normal height at surface 303 to increase the magnetic material at the insulation sheet interface. This positively offsets the resistive features of the sheet 304 of insulation in the path of the magnetic flux and reduces magnetic reluctance. There is no affect in such core modifications on the arrangement of the coil elements 306 or their cross-sectional shape with each of the stator core segments 302. The individual core segments 302 may also be shaped appropriately so as to reduce electric field stress between the segments without affecting the shape of the coil winding 306 or the cross-sectioned shape of the coil windings. For example, various radiuses 322 may be formed in the stator core segment 302 at the interface with the insulation sheet 304 as shown in FIG. 11. In that way modifications can be made to dimensions of the stator core segments proximate the sheets of insulation. Also, modifications may be made to the shape of the stator core segments and their surfaces to address the insulation sheets. Accordingly, the present invention provides design opportunities for the stator core that are not possible in conventional core construction that relies on ground wall insulation.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of this invention.

What is claimed is:

1. A wind turbine including a generator with a stator and a rotor mounted for providing electrical power to an electric grid, the wind turbine comprising:
   the stator having a stator core with a plurality of individual adjacent core segments coupled together for forming a segmented core;
   a concentrated winding element wound around each stator core segment for generating flux in the core segment; and
   an insulation element positioned between adjacent core segments for electrically isolating adjacent core segments from each other, wherein
   the stator core is coupled with a stator support element that is coupled to a generator housing, wherein the stator support element is an electrically insulative element or wherein the stator support element and each stator core segment are electrically isolated from each other.

2. The wind turbine according to claim 1, wherein each of the individual core segments being mounted to the stator support element through bolts to form a stator ring, wherein the bolts being electrically isolated from either the individual core segments or from the stator support element or both.

3. The wind turbine according to claim 1, wherein the insulation element includes a sheet of insulation material positioned between adjacent core segments.

4. The wind turbine according to claim 1 wherein the stator core includes an outer edge, the insulation element extending a distance beyond the outer edge.

5. The wind turbine according to claim 1 wherein the stator core includes an inner edge, the insulation element extending a distance beyond the inner edge.

6. The wind turbine according to claim 1 wherein the stator core provides electrical power in multiple phase signals, the core segments forming the stator in the form of a ring structure, with the ring structure providing electrical power in all of the multiple phase signals.

7. The wind turbine according to claim 1 wherein the stator core provides electrical power in multiple phase signals, the core segments forming the stator in the form of a plurality of ring structures, with each ring structure handling a single phase signal of the multiple phase signals.

8. The wind turbine according to claim 1 wherein the concentrated winding elements are coupled to the core segments through a high impedance connection.

9. The wind turbine according to claim 6 wherein the core segments and the concentrated winding elements for a phase signal are serially coupled with each other in the ring structure.

10. A method of generating electrical power in a wind turbine having a generator with a stator and a rotor, the method comprising:
    rotating the rotor with respect to the stator having a stator core with a plurality of individual adjacent core segments coupled together for forming a segmented core, a concentrated winding element being wound around each stator core segment for generating flux in the core segment;
    electrically insulating adjacent stator core segments from each other with an insulation element positioned between adjacent core segments; and
    coupling the stator core with a stator support element to a generator housing, wherein the stator support element is an electrically insulative element or wherein the stator support element and each stator core segment are electrically isolated from each other.

11. The method of claim 10 further comprising electrically insulating adjacent stator core segments from each other with a sheet of insulation material.

12. The method of claim 10 further comprising extending the insulation element a distance beyond an outer edge of the stator core.

13. The method of claim 10 further comprising extending the insulation element a distance beyond an inner edge of the stator core.

14. The method of claim 10 wherein the core segments form a stator ring structure, the method further comprising generating electrical power in multiple phase signals within the stator ring structure.

15. The method of claim 10 wherein the core segments forming the stator including a plurality of ring structures, the method further comprising generating electrical power in multiple phase signals with each ring structure handling a single phase signal of the multiple phase signals.

16. The method of claim 10 further comprising coupling the stator core winding elements to the core segments through a high impedance connection.

17. The method of claim 14 further comprising serially coupling the core segments and concentrated winding elements for a phase signal are serially coupled with each other in the stator ring structure.

18. A generator, comprising:
    a stator having a plurality of individual adjacent core segments coupled together to form a segmented core;
    a concentrated winding element wound around each one of the plurality of core segments for generating flux in the core segment; and
    a plurality of insulation elements, with each one of the plurality of insulation elements being positioned between adjacent core segments for electrically isolating adjacent core segments from each other,
    wherein the segmented core is coupled with a stator support element that is coupled to a generator housing, wherein the stator support element is an electrically insulative element or wherein the stator support element and each core segment are electrically isolated from each other, and
    wherein the segmented core includes an outer edge and an inner edge, and wherein each one of the plurality of insulation elements extends a distance beyond the outer edge, or a distance beyond the inner edge, or both.

19. The generator of claim 18, wherein each one of the plurality of insulation elements extends into the stator support element.

20. The generator of claim 18, wherein the plurality of insulation elements extend into respective slots formed by the segmented core.

* * * * *